United States Patent
Poranen et al.

(10) Patent No.: US 12,290,706 B2
(45) Date of Patent: May 6, 2025

(54) RESPIRATORY PROTECTIVE DEVICE OR FACE MASK HYGIENE PRODUCT, A METHOD FOR THE MANUFACTURE OF REINFORCED TEXTILE PART, NONWOVEN FABRIC PART OR THEIR COMBINATION PART, AND A FILTER

(71) Applicant: FORSSAN SUOJAINVALMISTUS OY, Forssa (FI)

(72) Inventors: Taneli Poranen, Savijoki (FI); Sami Kotiniemi, Forssa (FI)

( * ) Notice: Subject to any disclaimer, the term of this patent is extended or adjusted under 35 U.S.C. 154(b) by 0 days.

(21) Appl. No.: 18/269,717

(22) PCT Filed: Dec. 23, 2021

(86) PCT No.: PCT/EP2021/087535
§ 371 (c)(1),
(2) Date: Jun. 26, 2023

(87) PCT Pub. No.: WO2022/144310
PCT Pub. Date: Jul. 7, 2022

(65) Prior Publication Data
US 2023/0390593 A1   Dec. 7, 2023

(30) Foreign Application Priority Data
Dec. 28, 2020  (EP) .................... 20217414

(51) Int. Cl.
| | | |
|---|---|---|
| *A62B 18/02* | (2006.01) |
| *A41D 13/11* | (2006.01) |
| *A62B 23/02* | (2006.01) |
| *B29C 45/14* | (2006.01) |
| *B29K 23/00* | (2006.01) |

(Continued)

(52) U.S. Cl.
CPC ........ *A62B 18/025* (2013.01); *A41D 13/1146* (2013.01); *A41D 13/1161* (2013.01);
(Continued)

(58) Field of Classification Search
CPC ............ A41D 13/1146; A41D 13/1161; A62B 23/025; A62B 18/025; B29L 2031/14;
(Continued)

(56) References Cited

U.S. PATENT DOCUMENTS

| | | | |
|---|---|---|---|
| 3,154,073 A | 10/1964 | Klinger | |
| 3,861,381 A * | 1/1975 | Witman | ............... A62B 23/025 |
| | | | 128/206.12 |
| 2020/0360645 A1* | 11/2020 | Heimbuch | ........ A61M 16/0605 |

FOREIGN PATENT DOCUMENTS

| | | | |
|---|---|---|---|
| CN | 104512000 A | * | 4/2015 |
| CN | 206791737 U | | 12/2017 |

(Continued)

OTHER PUBLICATIONS

English Translation of CN104512000A retrieved from Espacenet (Year: 2024).*

(Continued)

*Primary Examiner* — Jacob T Minskey
*Assistant Examiner* — Elisa H Vera
(74) *Attorney, Agent, or Firm* — Hinckley, Allen & Snyder

(57) ABSTRACT

A faceblank (5) for a respiratory protective device or face mask hygiene product (1), where the shape of the faceblank (5) defines a number of filter openings (2, 3, 4) and which further comprises a head harness (6) or fastening for a head harness (6) and is characterised in that the filter openings (2, 3, 4) have been implemented to comprise a tongue (7), most advantageously so that the edge of each opening (2, 3, 4) is composed of a tongue. The faceblank is used with a number of replaceable filters (10) adapted in the filter openings (2, 3, 4) of the faceblank (5), each filter (10) comprising a filter part (11) and a frame (12) that encircles the filter part (11), in which frame (12) the outer edge has been implemented to comprise a groove (13)—most advantageously so that the (Continued)

outer edge of each frame (12) consists of a groove (13)—so that the filters (10) are fastenable to the filter openings (2, 3, 4) of the faceblank (5) by means of a tongue-and-groove connection, in which case the tongue (7) and groove (13) form an air-tight tongue-and-groove connection. Further independent claims directed to filters and methods for the manufacture of reinforced textile part, nonwoven fabric part or their combination part.

13 Claims, 14 Drawing Sheets

(51) Int. Cl.
   *B29K 223/00* (2006.01)
   *B29L 31/14* (2006.01)
   *B29L 31/48* (2006.01)
(52) U.S. Cl.
   CPC ...... *A62B 23/025* (2013.01); *B29C 45/14024* (2013.01); *B29C 45/14262* (2013.01); *B29C 45/14786* (2013.01); *B29C 45/14811* (2013.01); *B29K 2023/12* (2013.01); *B29K 2223/12* (2013.01); *B29K 2313/00* (2013.01); *B29L 2031/14* (2013.01); *B29L 2031/4835* (2013.01)
(58) Field of Classification Search
   CPC ......... B29L 2031/4835; B29K 2313/00; B29C 45/14024; B29C 45/14262
   See application file for complete search history.

(56) References Cited

FOREIGN PATENT DOCUMENTS

| | | |
|---|---|---|
| CN | 211188758 U | 8/2019 |
| CN | 110973736 A | 4/2020 |
| DE | 202020102639 U1 | 6/2020 |
| DE | 20202020002091 U1 | 6/2020 |
| EP | 1110610 A1 * | 6/2001 ......... B01L 3/50255 |
| KR | 10-2015-0068712 | 6/2015 |
| WO | 2010/144211 A2 | 12/2010 |

OTHER PUBLICATIONS

3M Science. Applied to Life. "Respiratory Protection for Airborne Exposures to Biohazards" Technical Data Bulletin, Release 5, Jun. 2020 (10 pgs.).
International Search Report and Written Opinion for Int'l Application No. PCT/EP2021/087535 dated May 10, 2022 (12 pgs.).
Extended European Search Report for EP Application No. 20217414.0 dated Jul. 5, 2021 (9 pgs.).
International Preliminary Report on Patentability for Int'l Application No. PCT/EP2021/087535, dated Feb. 14, 2023 (9 pgs.).
Hengityksensuojaimien Käyttö (2 pgs.).
Hengityksensuojaimien Käyttö @THL Updated: Oct. 27, 2020 with English translation Updated: Sep. 27, 22 (5 pgs.).
Notice of Reason for Rejection—Japanese Patent Application No. 2023-563156—Dated Feb. 6, 2024 (12 pgs.).
Israeli Office Action Communication—Notice of Deficiencies for Patent Application 303835—Dated Jul. 24, 2023 (4 pgs.).
Israeli Notice before Acceptance for Patent Application 303835—Dated Dec. 14, 2023 (3 pgs.).
New Zealand Office Action Dec. 20, 2024.
Notice of Grounds of Rejection in Korean Application 296031; Issued Nov. 25, 2024 Issued By the Korean Intellectual Property Office.
Decision of Rejection Of Japanese Patent Application No. 2023-563156, Transmitted Oct. 15, 2024 By the Japanese Patent Office.
Notice of Deficiencies for Patent Application 311720 Issued By the Israel Patent Office On Dec. 4, 2024.
Office Action From the Canadian Patent Office in Application 3,203,030 dated Nov. 21, 2024.

* cited by examiner

RESPIRATORY PROTECTIVE DEVICE OR FACE MASK HYGIENE PRODUCT, A METHOD FOR THE MANUFACTURE OF REINFORCED TEXTILE PART, NONWOVEN FABRIC PART OR THEIR COMBINATION PART, AND A FILTER

FIELD OF INVENTION

The invention is related to respiratory protective devices and face mask hygiene products and their manufacture on one hand and to the manufacture of reinforced textile parts, nonwoven fabric parts or their combination parts on the other hand.

TECHNICAL BACKGROUND

Since February/March 2020, many states in all parts of the world have decided to exceptionally impose restrictions on the freedom of movement of people as the COVID-19 epidemic turned into a pandemic. The use of respiratory protective devices has also been made mandatory in some countries, especially in public, places or public transport.

As shops ran out of industrially-manufactured respiratory protective devices at times, instructions have been shared on the Internet on how to make textile face masks from fabric. Industrially-manufactured respiratory protective devices made from non-woven fabric are in practice the most commonly used type. On the basis of waste accumulating on streets, it also appears that some people have ended up using surgical face masks, possibly partly because there has only been a limited supply of respiratory protective devices in places.

A surgical face mask is a medical device intended to protect the patient from pathogens present in the exhalation air of medical staff. A surgical face mask does not protect its user from airborne diseases.

Respiratory protective devices in the area of the European Union must fulfil the requirements of the personal protective equipment regulation (EU) 2016/425. As indication of the fulfilment of the requirement, the protective equipment must bear the CE marking. Respiratory protective devices include medical face masks, and on the other hand different types of respiratory protective devices intended for various purposes.

Medical face masks are used, for example, in and in particular when treating a patient who has an airborne disease. In this case, it is typically sufficient that the respiratory protective device filters aerosols with a size of at least 5 μm. The properties required from medical face masks have been defined in the European standard EN 14683:2019+AC:2019.

The technical requirements of respiratory protective devices and of filtering half masks that protect from particles have been presented in the European standard EN 149: 2009+A1:2009. The main filter or filters of such respiratory protective devices and half masks constitute an inseparable part of the device. The classes of such respiratory protective devices and half masks include FFP1, FFP2, FFP3, for example.

The technical requirements of respiratory protective devices equipped with a replaceable filter and of quarter and half masks that filter particles have been presented in the European standard EN 140:1998 and in correction AC:1999 of said standard. As an example, the Finnish Institute for Health and Welfare, which is an independent research agency operating under the Finnish Ministry of Social Affairs and Health, states practical protection factors for respiratory protective devices on its website (in Finnish) (https://thl.fi/fi/web/infektiotaudit-ja-rokotukset/taudit-ja-torjunta/infektioiden-ehkaisy-ja-torjuntaohjeita/hengi-tyksensuojaimien-kaytto).

The practical protection factor of respiratory protective devices means how many times over the protective device reduces the aerosol content of the breathed air with 95% of the persons, provided that the protective device sits well and that the user has been instructed to use the protective device. The practical protection factor of a filtering half mask, the efficiency class of which is FFP1 (EN 149), is 4. The practical protection factor of a filtering half mask, the efficiency class of which is FFP2 (EN 149), is 10. The practical protection factor of a filtering half mask, the efficiency class of which is FFP 3 (EN 149), is 20.

Correspondingly, the practical protection factor of half masks equipped with a P3 filter (EN 140 and EN 143) is 20.

On the other hand, it is known in practice that respiratory protective devices (EN 140) used against biohazards and equipped with a P3 filter (EN 143), for example half masks or quarter masks, can achieve a filtering efficiency of up to more than 99.95% (see Table A, 3M Company Personal Safety Division publication "Respiratory Protection for Airborne Exposures to Biohazards", #174 in series Technical Data Bulletin, Release 5, June 2020, downloaded on 1 Oct. 2020 from Internet address https://multimedia.Jm.com/mws/media/4099030/respiratory-protection-against-biohaz-ards.pdf).

Even though it might be possible to achieve a considerably better filtering result in favourable circumstances with a respiratory protective device equipped with a replaceable filter than with a respiratory protective device in accordance with the European standard EN 149:2009 or with a filtering half mask that protects against particles, respiratory protective devices equipped with a replaceable filter are relatively complex and their purchase price is relatively expensive.

US 2020/0360645 A1 discloses in FIG. 3 a respirator. The filter that is used in the respirator consists of a rim and a particulate air filter that is placed inside the rim. The outer shield portion is stretched over the air filter to form a tight seal around the air filter.

U.S. Pat. No. 3,153,073 discloses a respirator comprising a replaceable filter pad. The filter pad is provided with a plurality of peripherally spaced slots through which the tabs are inserted so as to keep the filter pad stretched tightly and to prevent relative displacement between the filter pad and frame. The frame will form a dust-tight seal between the perimeter of the filter pad and the in-turned flange portion of the respirator.

Objective of Invention

The objective according to the first aspect of the invention is to improve cleanability of reusable respiratory protective devices equipped with a replaceable filter. This objective is solvable by means of a respiratory protective device or face mask hygiene product according to one or more of the claims.

The objective of the invention alternative to or supplementary to the first objective is to simplify the manufacture of a reinforced textile part, nonwoven fabric part or their combination part. This objective can be solved by means of a method according to one or more of the claims.

A still further objective of the invention is to i) simplify the manufacture and ii) to improve comfort of filters for a respiratory protective device or face mask hygiene products.

Objective i) can be achieved with a filter according to one or more of the claims and objective ii) can be achieved with a filter according to one or more of the claims.

The dependent claims describe the preferred embodiments of the respiratory protective device/face mask hygiene product, filter and method.

One of the items of the invention is a respiratory protective device and its filter, or alternatively a face mask hygiene product and its filter. The respiratory protective device or face mask hygiene product can also be a medical device.

The respiratory protective device or face mask hygiene product is most advantageously a half mask or quarter mask, particularly advantageously, for example, one specified in the European standard EN 140:1998. Alternatively, the respiratory protective device can be an unassisted filtering device. The names of the parts of the half mask and quarter mask have been presented in the European standard EN 134:1998 under item 3.1.2, and the names of the parts of the unassisted filtering device have been presented under item 3.2.1 of the same standard.

Advantages of Invention

The respiratory protective device or face mask hygiene product according to the first aspect of the invention comprises a reusable faceblank, the shape of which defines a number of filter openings. Moreover, the faceblank comprises a head harness or fastening for a head harness. The filter openings have been implemented to comprise a tongue, most advantageously so that the edge of each opening is formed by a tongue such that the tongue encircles the filter openings of the faceblank all around.

The respiratory protective device of face mask hygiene product further comprises a number of replaceable filters adapted in the filter openings of the faceblank, each of which filters comprises a filter part and a frame that encircles the filter part. The frame has been fastened by moulding directly to the filter part. In the frame, the outer edge has been implemented to comprise a groove-most advantageously so that the outer edge of each frame consists of a groove-so that the filters are fastenable to the filter openings of the faceblank by means of a tongue-and-groove connection.

The tongue and groove form an air-tight tongue-and-groove connection.

The selected manner of execution of the tongue-and-groove connection has its significance: When the faceblank is to be reusable and the filters are to be mainly disposable, easy cleanability requires that the faceblank does not have any recesses or slots that might gather dirt or that would be difficult to clean or dry. Easy cleanability and dryability are accomplished precisely because the tongue encircles the filter holes of the faceblank all around, in which case it is possible to implement the filter holes without inward-turned recesses or slots.

Further, this gives an opportunity to implement the respiratory protective device or face mask hygiene product in a simple configuration. Firstly, it is not necessary to implement separate equipment connectors in the faceblank, and since a filter housing can also be omitted from the faceblank, it is possible to technically implement the faceblank in a simple manner.

Correspondingly, due to the manner of execution of the tongue-and-groove connection, the structure of the replaceable filters can also be kept simple and the replaceability of the filters can be implemented in a simple manner; however, so that the tongue-groove connection between the replaceable filters and the faceblank are gas-tight.

According to an advantageous aspect, the faceblank comprises mechanisms or protrusions that have been injection moulded to have a uniform material for the fastening of the head harness. Due to the uniform material, a sufficient strength is achieved in the structure so that the head harness of the respiratory protective device or face mask hygiene product remains fastened to the respiratory protective device or face mask hygiene product also when the going gets rough.

According to an advantageous aspect, the protrusions have pins for band fastening. In this case, the head harness can be implemented well as a band, such as a rubber band. This enables the reusability of the faceblank in a hygienic manner also if the next user of the faceblank is a different person. The faceblank can be washed after use most advantageously in an ordinary washing machine, for example. When the head harness (in other words the old band) is removed and discarded before washing and when the head harness (in other words the new band) is fastened after washing and drying, it is possible to ensure the hygiene of the part that comes against the hair and more generally against the back part of the head of the user of the head harness. The fastening of the head harness (in other words of the bands) to the faceblank can be implemented in a simple manner by means of pins.

According to an advantageous aspect, the head harness is implemented with replaceable bands, which are most advantageously rubber bands or comprise rubber bands. The replaceable bands are fastened particularly advantageously in the above-described manner to the pins of the faceblank. The term "rubber band" refers here and below to an elastic band, in other words elastic stretchability is a requirement, but it is not a requirement that the rubber band would contain rubber. As an example, medical rubber band does not contain rubber.

According to one advantageous aspect, the faceblank comprises a number of nose seals implemented in the faceblank in a materially uniform manner. There are most advantageously two nose seals, but the faceblank can also be implemented easily with one nose seal. The nose seal/seals has/have been formed by moulding by means of one-part mould halves placed opposite to each other, in which mould halves the moulding shape of the nose protrusion has been implemented by electric discharge machining. It is thus possible to implement the faceblank for faces and noses of several sizes so that it fits better, in other words is tighter. Moreover, the inventors have discovered that the nose seal/seals reduces/reduce the pressure exerted by the faceblank on the face, thus improving the usage comfort of the faceblank.

The respiratory protective device or face mask hygiene product can further comprise an exhalation valve adapted in one of the filter openings and connected to the surrounding frame. This enables the staying of the respiratory protective device or face mask hygiene product more tightly against the face also during exhalation, especially when the filters are clogged to some extent, in which case the respiratory protective device or face mask hygiene product would be pushed farther away from the face as a result of the pressure difference caused by exhalation. On the other hand, depending on the manner of execution, the valve can also relieve exhalation, which has significance in physically strenuous work, for example.

The filter for the respiratory protective device or face mask hygiene product comprises a filter part that contains textile and/or non-woven fabric, and a frame that encircles it. The frame has been fastened by moulding most advantageously by using the injection moulding method directly to the filter part using the method according to the second aspect of the invention.

According to an advantageous aspect, the filter part has been stretched when the moulding of the frame begins. In this way, it is possible to reduce or even avoid the flutter of the filter part during inhalation and exhalation. Some people think that the flapping sound created by the flutter of the filter part is annoying.

The filter most advantageously comprises several layers. In this way, it is possible, depending on the manner of execution, to improve the filtering efficiency or protect the filter layer, which is possibly more sensitive to contact, and to hence improve the operating reliability of such a more delicate filter layer. In particular for this reason, the filter can be implemented so that it comprises at least one filter layer and a number of coating layers, which protect the filter layer, arranged on its one side or both sides. This is a particularly advantageous mode of operation when the filter layer comprises electrically-charged filtering material (most advantageously a material based on polypropylene or a material containing polypropylene). In addition to or instead of electrically-charged filtering material, it is possible to use mechanical filters and/or filters that contain activated carbon.

The inventors have discovered that the flapping sound described in the preceding paragraph may appear with two filter material layers, but the flapping sound no longer appeared in test items that comprised at least three filter material layers.

In the other extreme mode of operation, the filter part of the filter comprises textile only in order to implement the filter used in a face mask hygiene product (in other words in the so-called everyman's mask). The filter material used can also be mechanically-filtering layers and activated carbon, for example (or material that contains activated carbon).

In the method for the manufacture of a reinforced textile part, nonwoven fabric part or their combination part, a part to be reinforced that comprises textile, non-woven fabric or both of these is placed in a mould while stretched and stretching is maintained at the same time as a frame, which encircles the part, is moulded-most advantageously by injection moulding-into the mould. In this way, it is possible to omit a possible stiffening structure, which would otherwise be required in the part, from the part.

Stretching is most advantageously carried out by pre-tensioning the part to be reinforced before closing the mould, and by using the mould to ensure that the pre-tensioning is maintained when the mould closes. Since the mould must close tightly in injection moulding, for example, the maintaining of the stretching or pre-tensioning due to the mould when the mould closes can be ensured in the handiest manner precisely by means of the mould.

The part to be reinforced is separated from a larger strip (in other words from a web) of textile, non-woven fabric or both by die cutting before moulding-most advantageously in a cutting part implemented in the mould-however, so that the part to be reinforced remains in a material connection with the larger strip, in other words some of the perimeter or circumference of the part to be reinforced is not die cut.

The larger strip is most advantageously a textile or non-woven fabric coming from a reel, or a number of textiles and/or non-woven fabrics coming from separate reels. In this way, it is possible to implement a manufacturing line whose automation is more advantageously implementable.

Most advantageously, the outside remains of textile or non-woven fabric in the part to be reinforced that are in a material connection are transferred in the feed direction from an opening mould without breaking off. In this way, it is possible to transfer the reinforced parts, which come out of the mould, easily away from the mould, which increases the safety of operation, because the moulds used in moulding are typically hot and the opening/closing mould is dangerous.

The part to be reinforced that comprises textile, non-woven fabric or both of these most advantageously comprises several material layers. In an advantageous embodiment of the method, material layers are pressed against each other during moulding, most advantageously by means of pins or similar arranged in the mould. In this way, the material layers can be made into a denser package also at the location of the frame, which enables an increase in the strength of the part to be reinforced. The moulding compound that is squeezed between the material layers, especially in thin layers, may have an impact whereby an individual material layer comes off the frame even at a relatively small force.

The pins or similar are most advantageously located in the frame area. In this way, it is possible to use the pins or similar also after moulding for pushing the reinforced part out of the mould after the mould has been opened.

In an advantageous embodiment of the method, several parts to be reinforced are moulded in parallel and transferred in the manufacturing process while in a material connection to each other, in other words without being detached from one another. This enables an increase in the capacity of serial production.

The faceblank is most advantageously manufactured in single-component moulding (like the fastening of the head harness, which fastening is most advantageously implemented in a materially uniform manner in the faceblank, for example so that the faceblank and the fastening/fastenings is/are moulded at the same time). The head harness is most advantageously manufactured from a single material. In the filters, the filter part and the frame are most advantageously manufactured from the same (most preferably a single) material. By doing so, the components can be separated from each other for recycling in a highly simple manner.

It is possible to advantageously use polypropylene in the filter part (as filter fabric/fabrics) and in the filter frame, for example, which enables the recycling of the filters as such when a potential risk of contamination has been taken care of. In this case, the filters can be utilised in energy use by combustion, for example. The filter part is best non-woven (for example polypropylene) and the frame is moulded and of hard plastic (for example polypropylene).

LIST OF DRAWINGS

In what follows, the implementation of the respiratory protective device or face mask hygiene product, faceblank, filter and on the other hand also of the method according to the invention is discussed in more detail by means of the embodiments presented in the enclosed drawings. Of the drawings:

FIGS. 1-4 show a faceblank;
FIG. 5 shows a filter;
FIG. 6 shows section VI-VI made at the frame of the filter of FIG. 5;
FIG. 7 shows a respiratory protective device or face mask hygiene product;
FIGS. 8-9 show a first part of a mould;

The same reference numbers refer to the same technical characteristics in all FIGS.

DETAILED DESCRIPTION OF THE INVENTION

Figure 1:
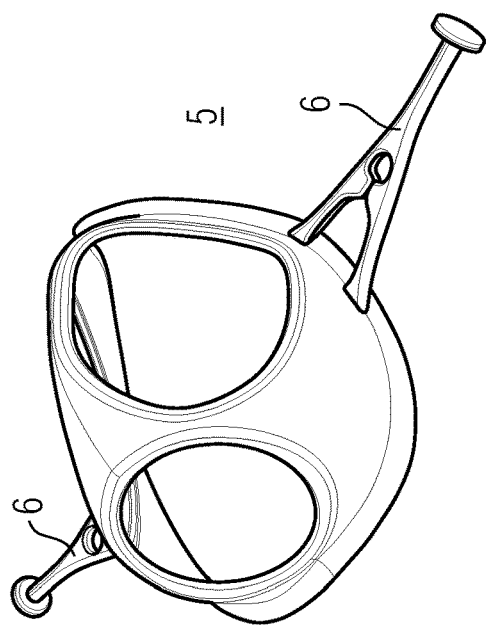

I: Faceblank, Filter and Respiratory Protective Device/Face Mask Hygiene Product FIGS. 1-4 show a faceblank 5. The shape of the faceblank 5 defines a number of filter openings 2, 3, 4, most advantageously a right-hand side opening 2, a left-hand side opening 3 and a bottom opening 4. The faceblank 5 further comprises a head harness 6 or a fastening for a head harness 6 and is characterised in that the filter openings 2, 3, 4 have been implemented to comprise a tongue 7, most advantageously so that the edge of each opening 2, 3, 4 is composed of a tongue.

Figure 2:
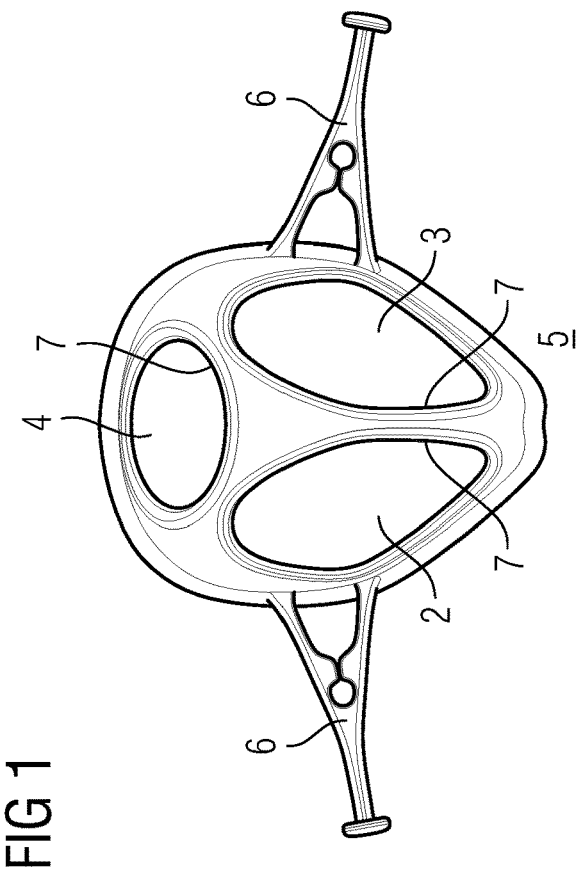
Figure 3:
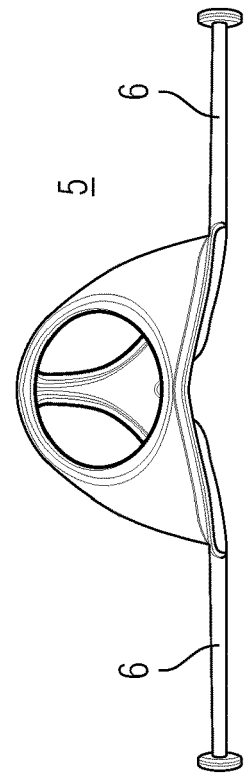
Figure 4:
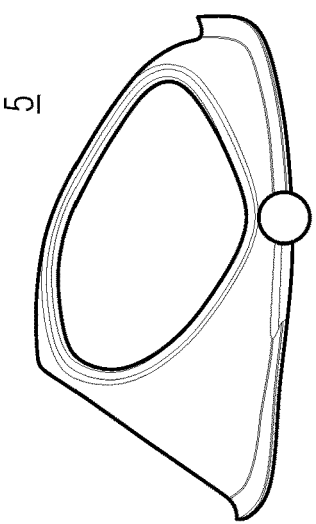

FIG. 2 shows a fastening 6 for a head harness: the free end of the fastening 6 is bent towards the faceblank 5 and fastened in a form-restricted manner by taking a knob or bulge into a slot, in which case the fastening 6 forms a loop or eyelet. The knob or bulge relieves the pressure exerted by the fastening 6 on the face, and the loop or eyelet can be implemented to be made by just one hand. The faceblank 5 is fastened into place on the user's head so that a band (in particular a rubber band) or similar is fastened to the loops or eyelets, by means of which band or similar the faceblank 5 is tightened against the user's face.

The faceblank 5 can comprise a mechanism that has been moulded to be most advantageously of uniform material, most preferably by the same moulding method (such as injection moulding) with which the faceblank 5 has been moulded, for example protrusions for the fastening of the head harness 6 (such as bands, in particular rubber bands).

The faceblank 5 is manufactured most advantageously to be reusable so that replaceable filters 10 are installed in it.

The faceblank 5 consists of a piece which has the shape of a so-called half an avocado and which imitates the shape of the face. The material used in the faceblank 5 is most advantageously of elastomer (silicone, polyurethane etc.), but inelastic materials are also possible.

The filter openings 2, 3, 4 have been implemented to comprise a tongue 7, most advantageously so that the edge of each opening 2, 3, 4 is composed of a tongue 7.

Figure 5:
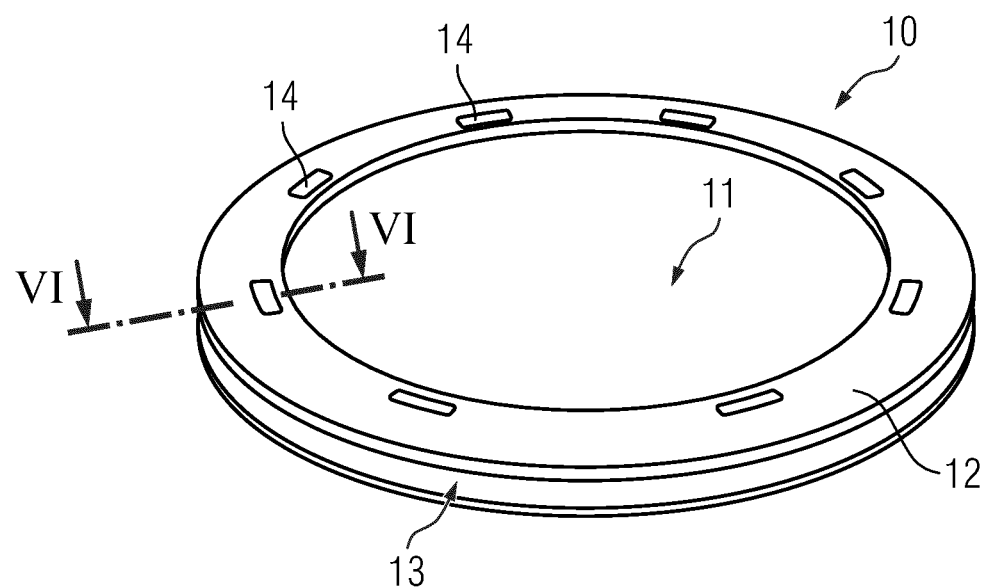
Figure 6:
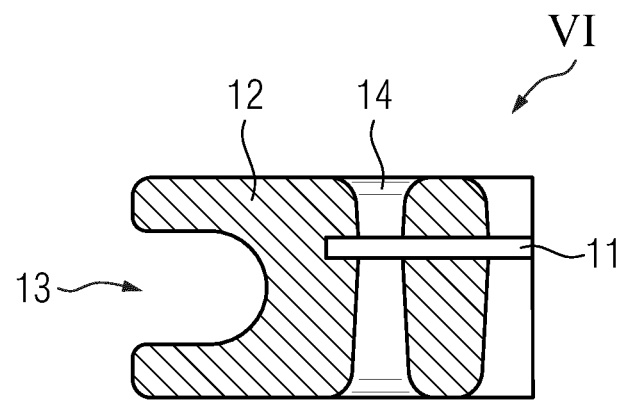

FIG. 5 shows a filter 10. Each filter comprises a filter part 11 and a frame 12 that encircles the filter part 11, in which frame 12 the outer edge has been implemented to comprise a groove 13—most advantageously so that the outer edge of each frame 12 consists of a groove 13—so that the filters 10 are fastenable to the filter openings 2, 3, 4 of the faceblank 5 by means of a tongue-and-groove connection, in which case the tongue 7 and groove 13 form an air-tight tongue-and-groove connection. The implementation of the frame 12 of the filter 10 and the groove is shown in section VI-VI shown in FIG. 6.

Figure 7:
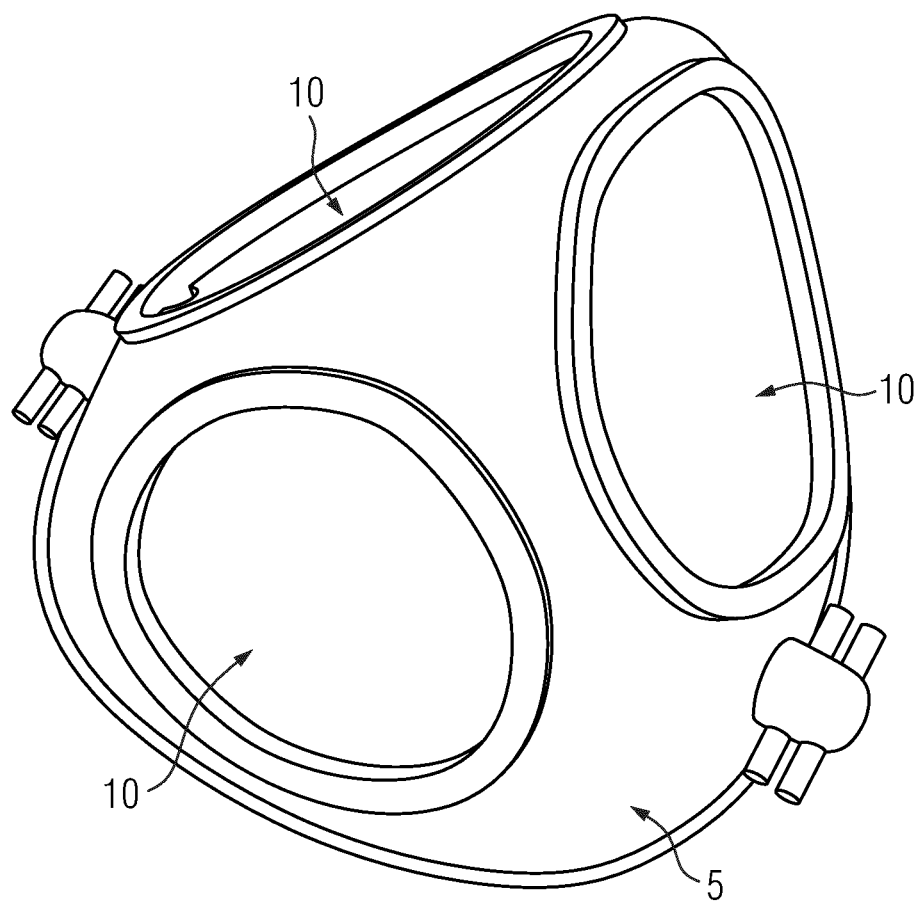

FIG. 7 shows a respiratory protective device or face mask hygiene product 1, where filters 10 have been placed into place in the filter openings 2, 3, 4 located in the faceblank 5. The respiratory protective device 1 or face mask hygiene product 1 can, in addition to the filters or instead of some filter 10, comprise an exhalation valve adapted in one of the filter openings 2, 3, 4 and connected to the surrounding frame 12.

The edges of the filter openings 2, 3, 4, in other words the tongue 7, are so shaped that they sit in an air-tight, manner in the groove 13 of the frame 12 of the filters 10 and so that the filters 10 with their integrated frame are replaceable.

It is possible to use various replaceable moulding parts to mould symbols, logos or emblems used in marketing or communications in the faceblank 5. Instead of this or in addition to this, it is possible to print, press or fasten symbols, logos or emblems in the faceblank 5.

The targeted service life of the faceblank 5 is most advantageously at least 100 times of use (number of replacements of filters), which enables a smaller price per time of use of the faceblank.

The frame 12 of the filters 10 is primarily of hard plastic. Polypropylene, for example, guarantees the recyclability of the filters 10 due to a homogeneous composition.

The filters 10 can be manufactured with different filtering classes, colours and additional properties. The filter part 11 consists of one or more similar or different filter material layers, which are either textile and/or non-woven fabric. Polypropylene-based, electrically-charged filtering material as well as surface layers that protect the actual filter layer are most advantageously used. Just textile without filtering properties can also be used in the frame 12 for so-called everyman's masks.

Instead of the filter material or in addition to the filter material, an exhalation valve can be connected to one or more frames 12, for example for the building industry.

The filters 10 are printed, most advantageously in the manufacturing process, with their filtering class, manufacturing and expiration date as well as the place of manufacture and (within the European Economic Area) the CE marking as well as possibly also the identification of the notified body, most likely using laser technology or pad printing (Tampondruck in German). After this, the filters 10 are packed in air-tight packaging.

The respiratory protective device or face mask hygiene product 1 is implementable as CE-certified personal protective equipment in accordance with the EU standard EN140: 1998 (including corrections AC:1999). In this case, the filters 10 are detachable.

Alternatively, the respiratory protective device or face mask hygiene product 1 is implementable, if desired, also as CE-certified personal protective equipment in accordance with the EU standard EN149:2009. In this case, the filters 10 would not be detachable.

The targeted filtering classes include (FFP1-FFP3 Al NR), where: FFP1-FFP3 denotes the filtering level or class, Al a reusable frame, and NR a Not Reusable filter. Moreover, when the frame of the mask if water-proof (primarily based on elastomer), splash resistance can be added to the filters, too, in which case the additional class Type IIR can be sought for the type approval of the mask. Type IIR is a classification that enables working in surgical conditions, and its manufacture requires the manufacturing permit of a medical device. This is why the respiratory protective device or face mask hygiene product 1 can also be implemented in accordance with "European Medical Device Directive (93/42/EEC) and EN 14683:2005 Type IIR for use as a surgical mask".

The purpose of the best possible, tight fitting of the respiratory protective device or face mask hygiene product 1 against different kinds of faces in various (working) positions is to achieve a by-pass flow of a maximum of 0-1%. By-pass flow refers to the air that flows/escapes in an uncontrolled manner between the respiratory protective device or face mask hygiene product and the face when breathing out or in. This can be affected directly by balancing the pressure difference by means of a maximal filtering area. The smaller the filter area, the greater the need for pressure balancing (leak) between the edges of the respiratory protective device or face mask hygiene product 1 and the face, and the smaller the volume of air that travels per a square centimetre of the filter.

After the optimum solution, the changing of the filter material or the selection of the frame material or the stiffness of the faceblank 5 can be used for having an effect that reduces the filtering level, if that is to be desired.

II: On the Possible Implementation of Pins or Fastening Mechanism

The goal in the manufacture of the respiratory protective device or face mask hygiene product 1 is to have as few work stages as possible and an as high processing degree per work stage as possible. Primarily, this is sought by using the injection moulding technique and by integrating functions in the moulds.

Manufacturing process of the tightening mechanisms of the rubber bands in the moulding process.

The tightening mechanism according to the first embodiment consists of a part in the shape of the letter H, where the "transverse line of the letter H" is of the same material as the frame of the mask, while the "vertical lines of the letter H" are most advantageously of (hard) plastic.

Plastic is used so that elastomer would not lose its restoration ability too rapidly by the rubbing and pull of the rubber bands. Other alternatives for use as the fastening method are also examined. When this is being written, the most advantageous alternative would seem to be that the faceblank 5 is implemented as a one-part component.

The primary purpose is to guarantee the fastening of the respiratory protective device or face mask hygiene product 1 behind the head with, for example, two rubber bands, the tightness of which can be adjusted. Moreover, it is important that the rubber band is disposable, not reusable, due to hygiene reasons. The rubber band is discarded/recycled when the filters 10 are replaced, and new rubber bands are always delivered in the packaging of the filters 10 for the respiratory protective device or face mask hygiene product.

Manufacturing Process:
1. When the mould 100 (frame mould) is open, two plastic lines are pushed into place from reels on both sides of the upcoming respiratory protective device or face mask hygiene product (total quantity: four) (upcoming vertical lines of the letter H).
2. When the mould 100 closes, the mould 100 cuts the vertical lines of the letter H to their dimension and squeezes their ends tightly against the moulding.
3. Molten frame compound is injected into the closed mould 100, into the fastening mechanism of the faceblank 5 (frame) of each respiratory protective device or face mask hygiene product 1 and at the same time hence into the fastening mechanism of the transverse line of the letter H.
4. The mould opens and ejectors drop a completed faceblank 5 (frame) of the respiratory protective device or face mask hygiene product 1 further to the process.
5. Repeat.

III: Method for the Manufacture of Reinforced Textile Part, Nonwoven Fabric Part or their Combination Part The method described here is used advantageously for the manufacture of filters 10. In addition to this or instead of this, the method can be used for the manufacture of even other reinforced textile parts, nonwoven fabric parts or their combination parts.

Figure 8:
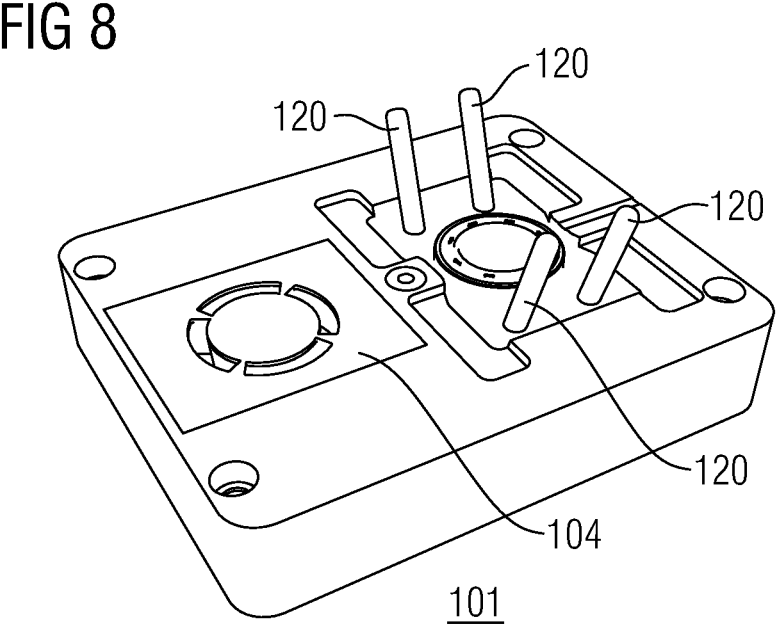
Figure 9:
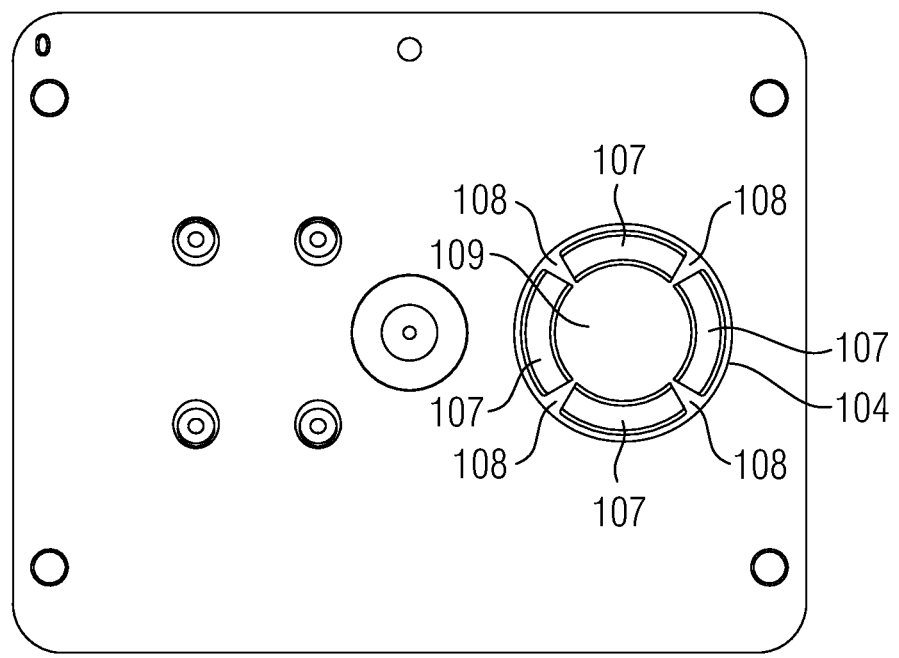
Figure 10:
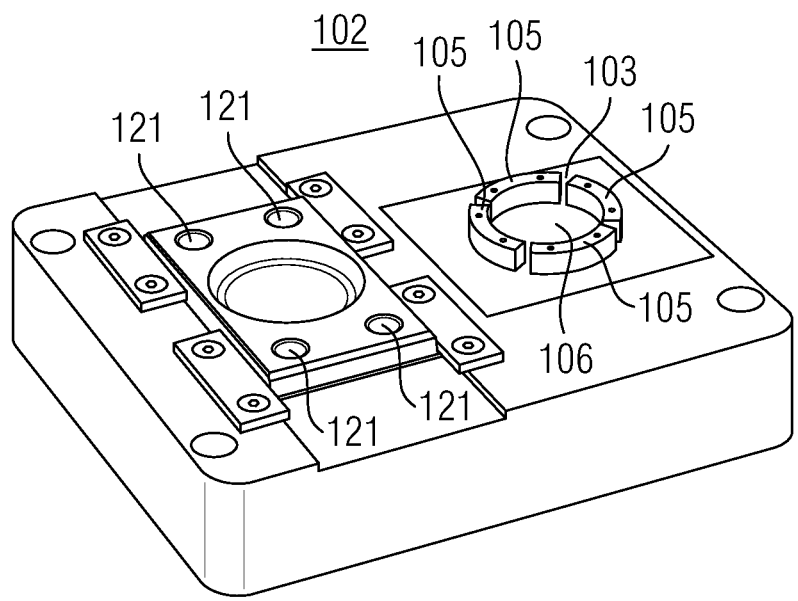
FIGS. 10-11 show a second part of a mould.
Figure 11:
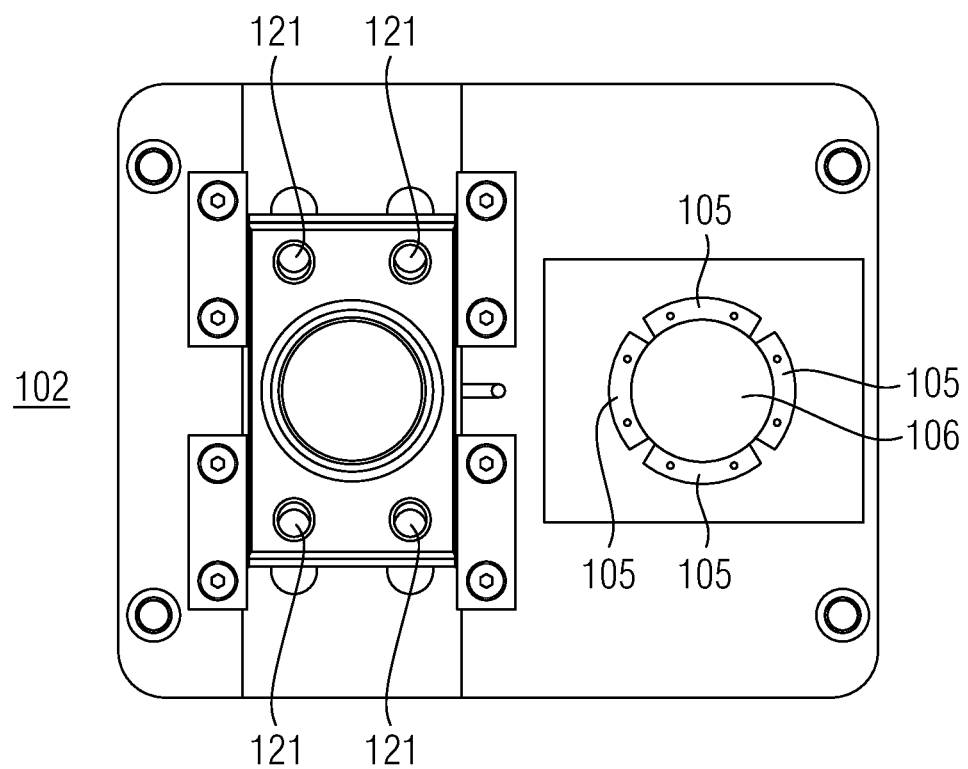
Figure 12:
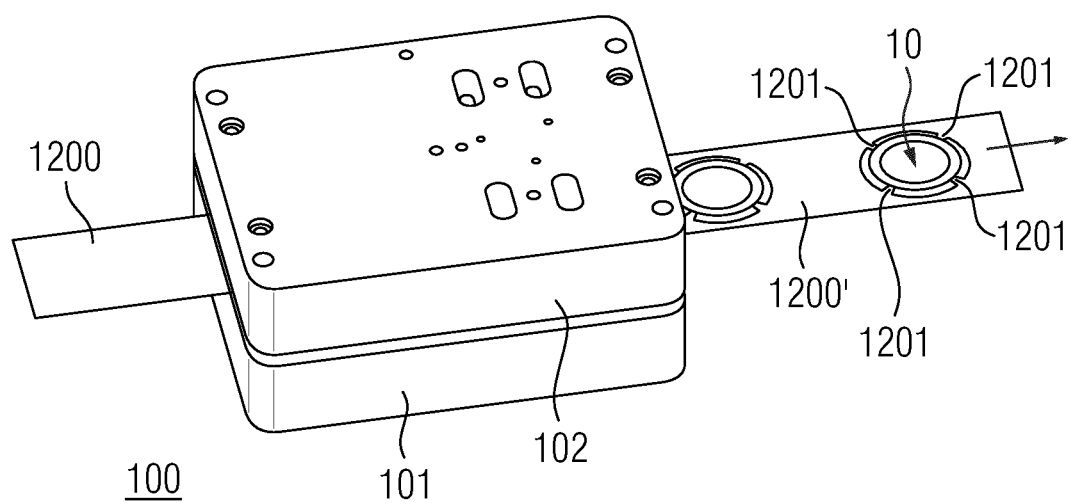
FIG. 12 shows cutting and moulding with the mould closed, strip in closed mould.
Figure 14:
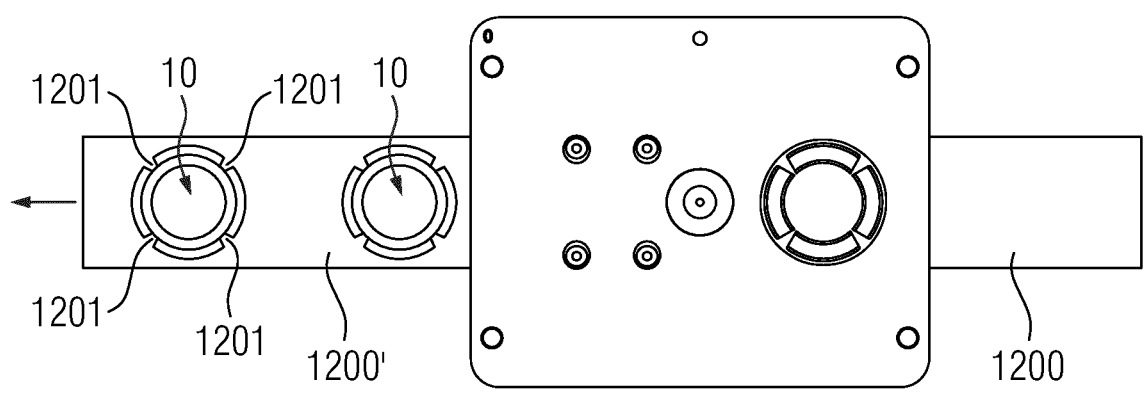

A mould 100, which contains a first part 101 and a second part 102, is most advantageously used in the method. FIG. 12 shows the mould 100 in the closed position. FIGS. 8 and 9 show the first part 101 of the mould 100, and FIGS. 10 and 11 show the second part 102 of the mould 100. FIG. 12 also shows a web 1200, which is fed into the mould 100, where the filter part 11 is first cut (die cut) so that it remains joined to the web 1200 by the uncut parts 1201, and then the frame 12 is moulded. The arrow shown in FIG. 12 describes the direction in which the web 1200 is moved. In other words, the filters 10 remain joined to the remaining web 1200', to which the filters 10 have been moulded. It is thus possible to use the remaining web 1200' in a way as a conveyor belt in serial production or as part of a conveyor belt to carry the filters 10 forward. This is also indicated in FIG. 14.

Manufacturing Process of Filters 10:

Cutting
1. A filter web 1200 of a desired type (web refers to a continuous band), which filter web 1200 most preferably consists of at least one but most advantageously of several layers, a continuous filter material runs between the halves 101, 102 of the mould 100.
2. (IN STARTING) The mould 100 closes for the first time while empty, in which case:
   a. The filter web 1200 becomes cut to the shape required by the frame 12 in the positioning so that it remains joined to the filter web 1200 by the small uncut parts 1201, or "trimmings", that are at an angle of, for example, 45 degrees, and can move with it to the next stage. In other words, the filter part 11 is separated from the filter web 1200 by means of incomplete cutting, most advantageously by pressing with a die cutting press 103 to the counter piece 104 of the die cutting press, so that that part of the web 1200 which corresponds to the middle part 106 of the die cutting press forms the filter part 11 remains joined to the filter web 1200 while the parts 105 of the die cutting press cut, in joint action with the parts 107 of the counter piece of the die cutting press, the extra pieces out of the filter web 1200 and filter part 11. The "trimmings" are formed by the areas that remain between the parts of the die cutting press; there can be one or more such areas.
   b. The extra pieces (in other words waste pieces) that have been cut off the filter web 1200 and filter part 11 are blown or sucked through the mould to be discarded. Air is blown or sucked through holes in the cutter, and the waste pieces fly or shift through the mould to be discarded.

3. The mould 100 closes for the second time for moulding, in which case:
   a. The cut filter web 1200 moves to the moulding point (described from item 2 onwards) and
   b. the next point on the filter web 1200 becomes cut simultaneously in positioning (described from item 4 onwards)

Figure 13:
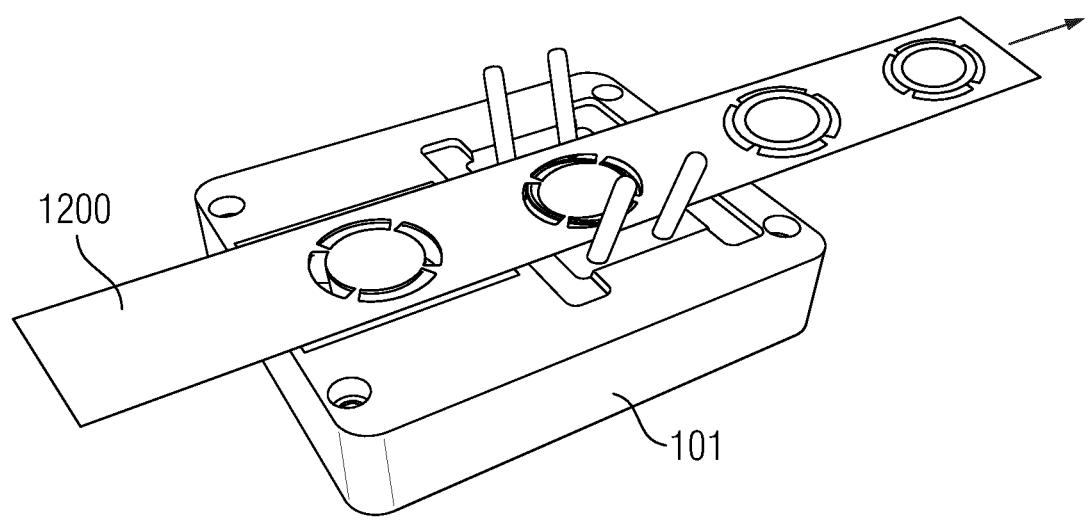
FIGS. 13 and 14 show the mould opened after cutting and moulding, strip in opened mould.

This process is illustrated by the opened mould 100, FIG. 13, which shows the cutting taking place in the first part 101 of the mould 100 in the drawing on the left, and the positioning and moulding taking place after transfer on the right. The positioning and moulding are described in more detail below.

Positioning and Moulding

4. When the mould 100 closes:
   a. Guide pins 120 and guide holes 121 close slides, which form a groove to a desired depth. In addition to or instead of guide pins, it is also possible to use other mechanic closing devices, such as cylinders. The cut, aligned filter web 1200 remains in place in the mould at the desired "depth" with respect to the cross section of the frame 12.
   b. Potential glides close, forming the rebate of the moulding when using a groove 13 in the frame 12.

5. Plastic is injected into the mould, in which case the frame 12 is formed around the filter web 1200.

In addition to this or as an alternative to this, an exhalation valve is moulded in the filter 10 at the same time, either in the filter part 11 or the filter part 11 is replaced with it.

6. When the moulding has cooled, the mould 100 is opened and an ejector pin pushes the filter 10 out of the mould 100, transferring it forward in the process.

7. The web 1200 moves forward to the next process stage.

8. Repeat (from item 4 onwards).

Figure 15:
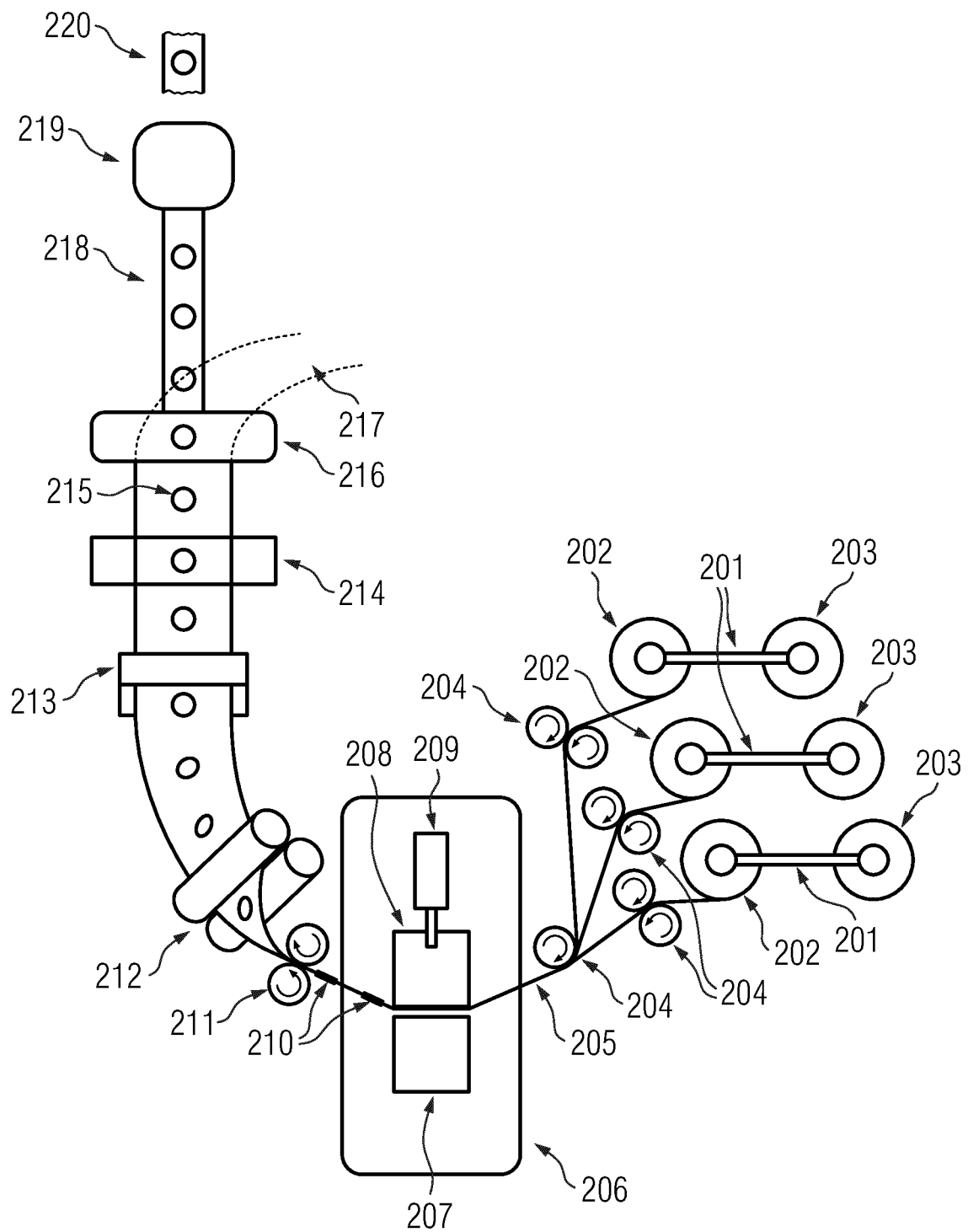
FIG. 15 shows equipment designed to implement the method.

It is possible to mould several filters 10 simultaneously with the method, just as long as this is taken into consideration in the cutting and moulding mould 100. FIG. 15 shows one round filter 100 joined to the web.

Figure 16:
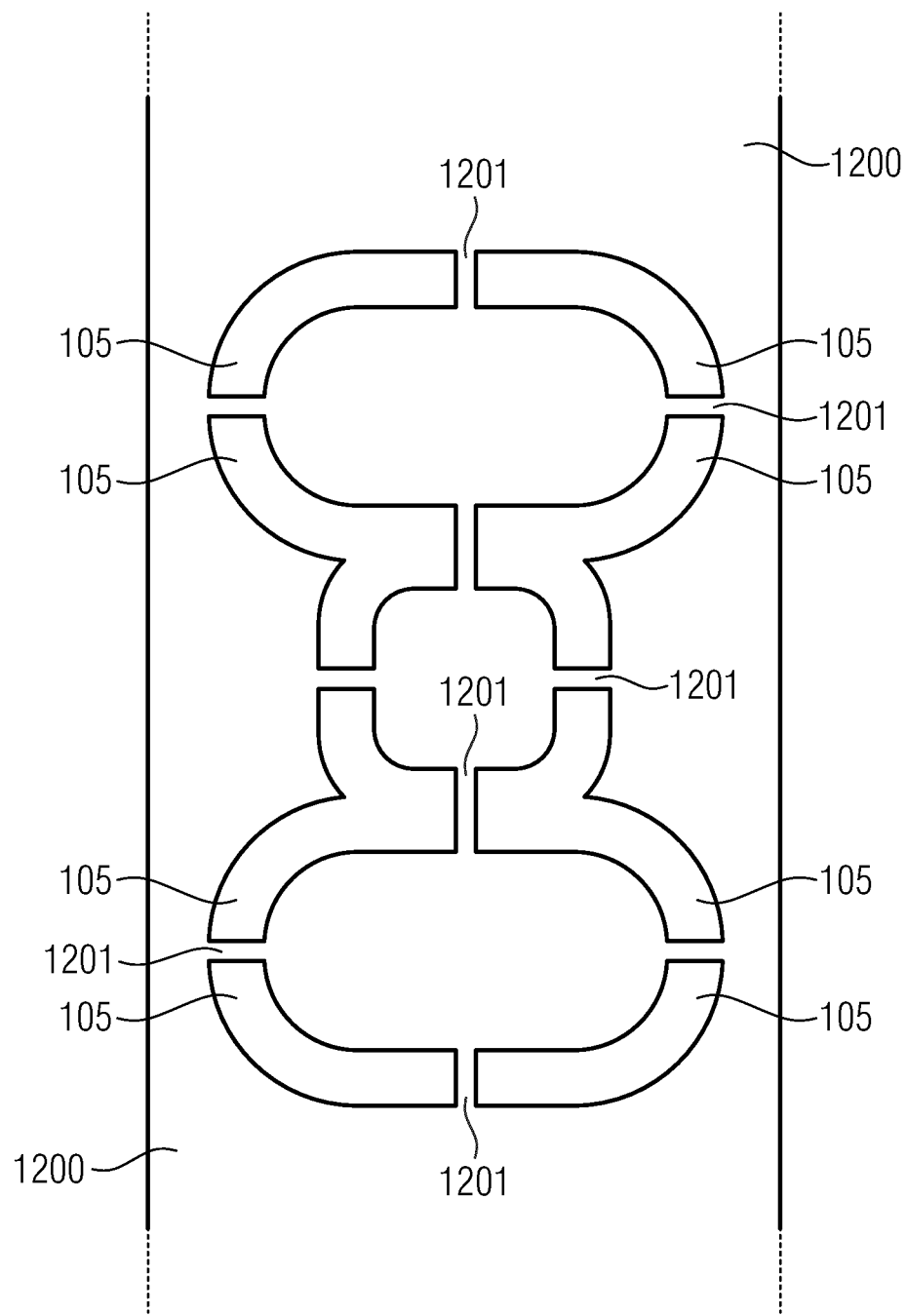
FIG. 16 shows three filters manufactured in parallel in a mould (more precisely: in the cutting part of mould)
Figure 17:
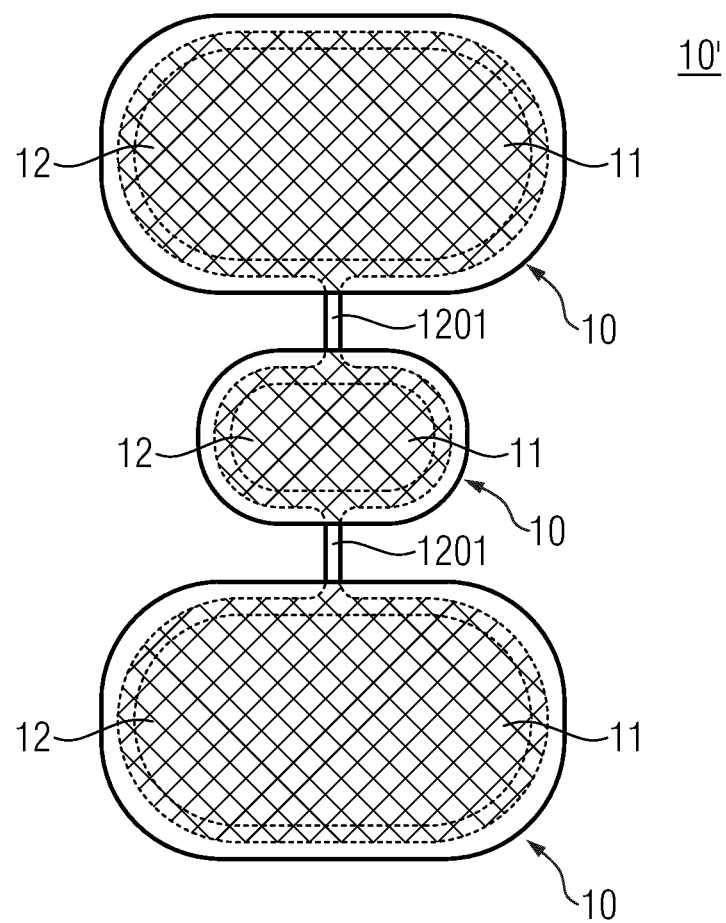
FIG. 17 shows a filter set, with three filters manufactured in parallel.
Figure 18:
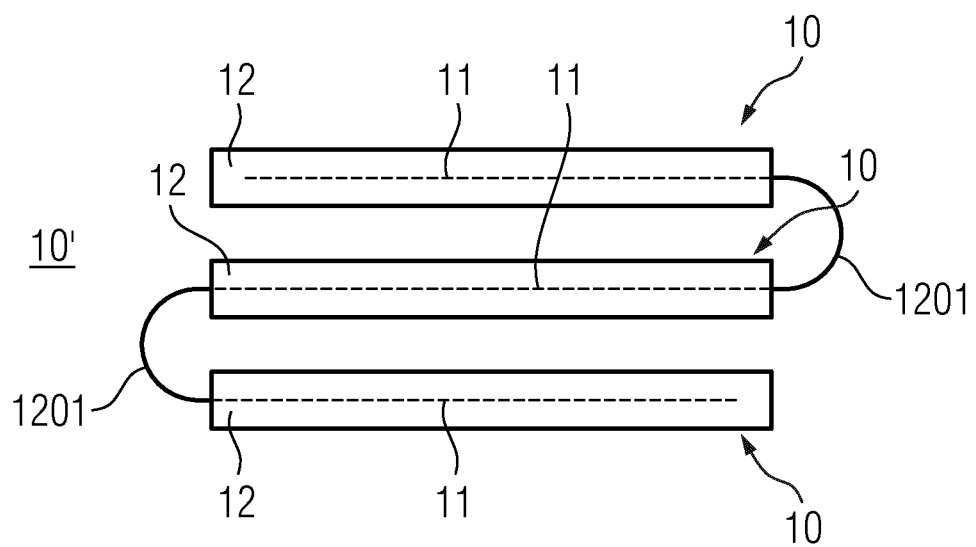
FIG. 18 shows a filter set folded together.

FIGS. 16-18 show an embodiment of the parallel manufacture of several filters 10, implemented on a corresponding manufacturing line as that shown in FIG. 15. In this case, the filters 10 form a filter set 10', where the filters 10 are joined to each other as a usage set, for example, which contains all the filters 10 needed for a use of one faceblank 5. In this case, packing is as easy as possible, and one filter set 10' would follow each other throughout the process from the beginning to the end, for example to marking (it has been described above that laser marking, for example, could be used) and packaging.

FIG. 16 shows a filter set 10' viewed from above in a mould (more precisely: in the cutting part of a mould) before the moulding of the frames 12. The uncut parts 1201 of the web 1200 and on the other hand the parts of the die cutting press 105 have been marked in FIG. 16. The parts of the die cutting press 105 surround the uncut parts and, on the other hand, form channels, in which the uncut parts 1201 remain. In the filter set 10', such channels can be formed between individual filters 10 in order to keep the filters 10 joined to each other. In the above-described manner, this facilitates the handling and packing of the filters 10.

FIG. 17 shows correspondingly a complete set 10'. The filter part 11 formed from the web 1200 or webs is indicated with line shadowing. The part of the web 1200 that remains inside the frame 12 which part does not constitute the filter part 11—has been indicated with line shadowing in broken line. Even though this part of the web 1200 does not constitute the filter part 11, it is needed in accordance with what has been described above to tighten the filter part 11 in the frame 12. The uncut part 11 has also been formed from the web 1200. However, it has not been line-shadowed in FIG. 17, because they do not constitute a functional part of the filter 10—said parts can be torn off, for example, before installing the filter 10 to the faceblank 5.

The mode of operation described here enables the foldability of the filter set 10' in a handy manner.

Faceblank and Replaceable Filters

The filters 10 are delivered so that they are packed in a bag as a set of one mask. Hand tissues (one or more) intended for the disinfection of hands/the mask are (likely) also delivered with the bag. The first hand tissue is intended for the disinfection of hands, the second for the disinfection of the frame of the mask.

Used filters 10 are popped out or pressed out of the faceblank 5 first and recycled/discarded. After this, hands are disinfected and then the faceblank 5.

New filters 10 are detached from each other and placed one by one in the filter openings 2, 3, 4 of the faceblank 5 by stretching the frame of the faceblank 5 a little so that the tongues 7 in the faceblank 5 can settle into the groove 13 in the frame 12.

Cleanability

The frame of the faceblank 5 is shaped so that it is easily cleanable and the surface is smooth.

The natural shape of the faceblank 5 enables, for example, the flowing of washing water away from over the mask.

The faceblank 5 can also be cleaned with a cleaning tissue intended for this purpose, using a disinfectant or detergent. The frame of the faceblank 5 is intended to be dishwasher proof.

Example of a Production Line for the Application of the Manufacturing Method for a Reinforced Textile Part, Nonwoven Fabric Part or their Combination Part FIG. 15 shows a possible production line. The filter part 11 of the filters 10 or more generally that part of the combination part that is to be reinforced is most advantageously stored in a number of reels 202, 203. Some of the reels can be main reels 202 and some auxiliary reels 203. The reels 202, 203 are most advantageously breakable, for example by means of reel brakes 201. Guide rolls 204 guide the material taken from the reels 202, 203 to become a combined web 205, which is guided into an injection moulding machine 206, which contains a mould 100. FIG. 15 shows the corresponding parts of the mould 100: the moving side 207 of the mould (first part 101 of the mould) and the non-moving side 208 of the mould (second part 102 of the mould). The moving side of the mould 100 closes against the solid side on the side of the extrusion screw and the extrusion screw feeds the moulding compound into the mould 100.

After moulding, the moulded pieces 210 are joined in the combined web 205. The moulded pieces 210 are, for example, filters 10.

Pincher rolls 211 pull the web. Turn rolls 212, 213 guide the webs for marking, for example to a laser marking device 214. Laser-marked pieces are detached from the web on a detaching device 216 and the waste web is removed on a removal device 217. A conveyor belt 218 carries the marked pieces to packing equipment 219. After packing, the packed products 220 are ready for further delivery.

The production line is most advantageously located in a clean room. By means of the above-described arrangement of the production line, the production line is implementable as relatively short and/or in small size, which enables the use of a smaller clean room.

Faceblank with Nose Seal

Figure 19:
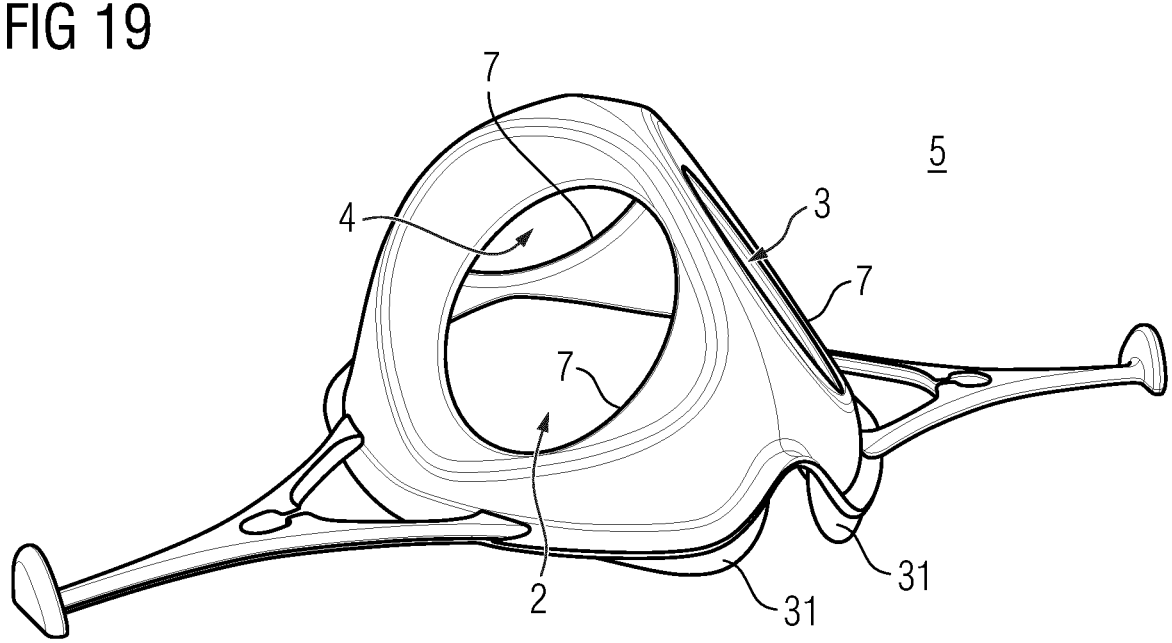
FIGS. 19 and 20 show an advantageous embodiment of the faceblank.
Figure 20:
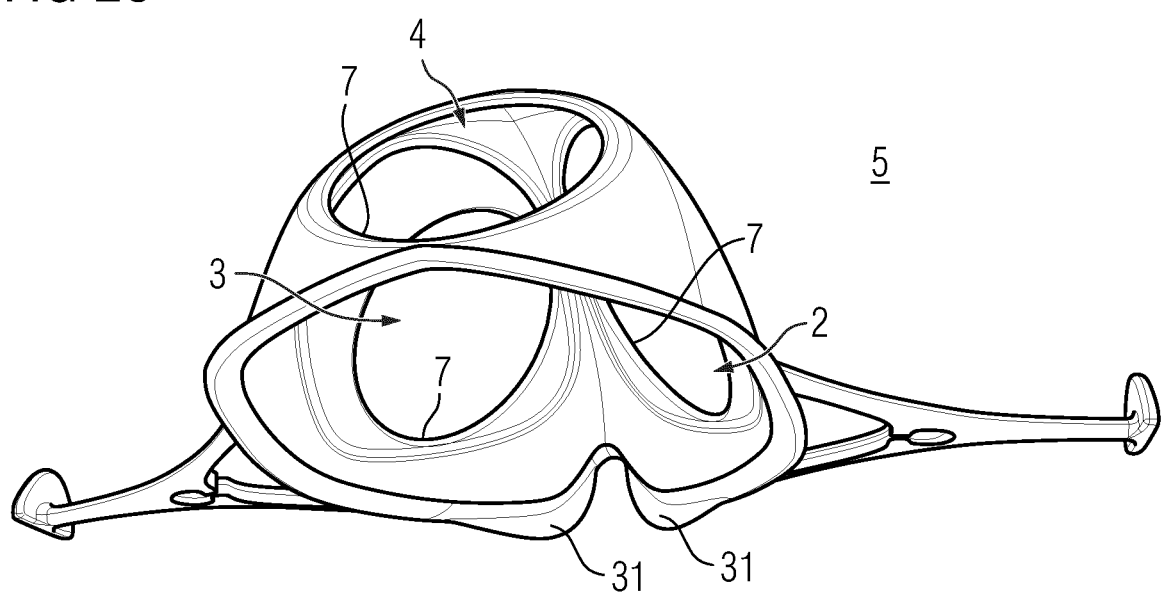

The faceblank 5 becomes tighter for faces of various sizes and shapes when it includes a number of nose seals 31. FIGS. 19 and 20 show a faceblank 5 equipped with nose seals 31. For hygiene reasons, the nose seals 31 are implemented most advantageously so that they are integrated into the faceblank 5, for example as fin-like protrusions. In practice, a nose seal 31 implemented as fin-like protrusions presses against the user's face. The inventors have noticed that it reduces the pressure exerted by the respiratory protective device/face mask hygiene product 1 on the face, because the nose seal 31 distributes the pressing directed at the face over a larger area. In this way, it is possible to improve the usage comfort of the respiratory protective device/face mask hygiene product.

The shape of the nose seal 31 forms a hinter-cut in the mould. This is not a problem if the mould is implemented in two parts. In this case, however, a seam remains at the joining joint of the moulds, which seam tends to feel uncomfortable, because there are a lot of nerves in the skin of the face. The machining of nose seals 31 in a single-part mould using a CNC machine, such as by milling, is not possible due to the moulding shape required from the mould, because the frame of the faceblank 5 would prevent the formation of a recess required for the nose seal 31.

This is why it is more advantageous to implement the moulding shape required by the nose seal 31 by electric discharge machining (EDM). For this purpose, an electrode 40 that contains the moulding pattern 41 of the nose seal is used in the manufacture of the mould of the faceblank 5. The line L marked in FIG. 21 describes the edge of the moulding pattern 41. The mould machined using a CNC machine (for example, an aluminium mould) is modified after machining by implementing, most advantageously by electric discharge machining, a moulding shape 58 in accordance with the moulding pattern 41 by means of an electrode and, for example, an EDM machine.

Figure 21:
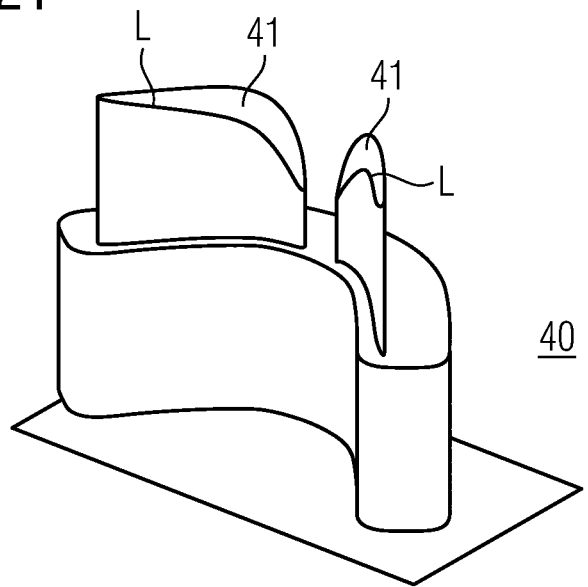
FIG. 21 shows an electrode for the formation of the moulding shape of the nose seal of the faceblank.
Figure 22:
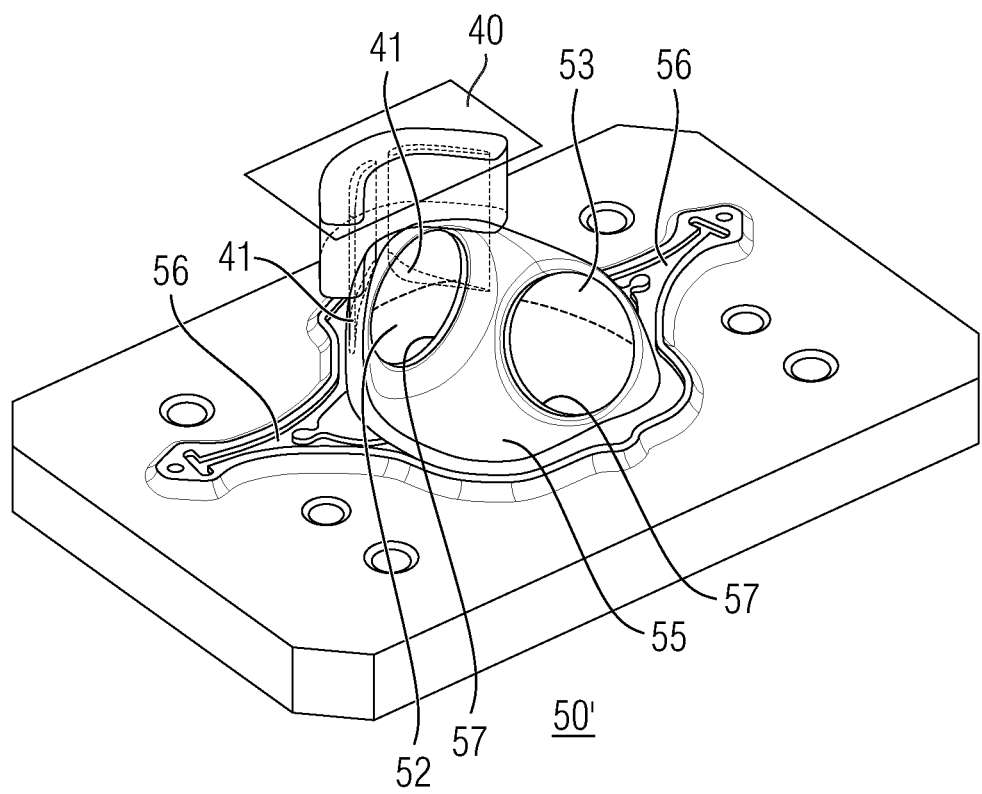
FIG. 22 shows the electrode shown in FIG. 21 in its place in the mould.

FIG. 22 shows a half 50' of the mould of the faceblank 5 before the implementation of the moulding shape 58 of the nose seal, where the electrode in accordance with FIG. 21 is already in place. An EDM machine forms the moulding shape 58 in the mould half 50 by means of electric discharge machining in the manner shown in FIG. 23.

Figure 23:
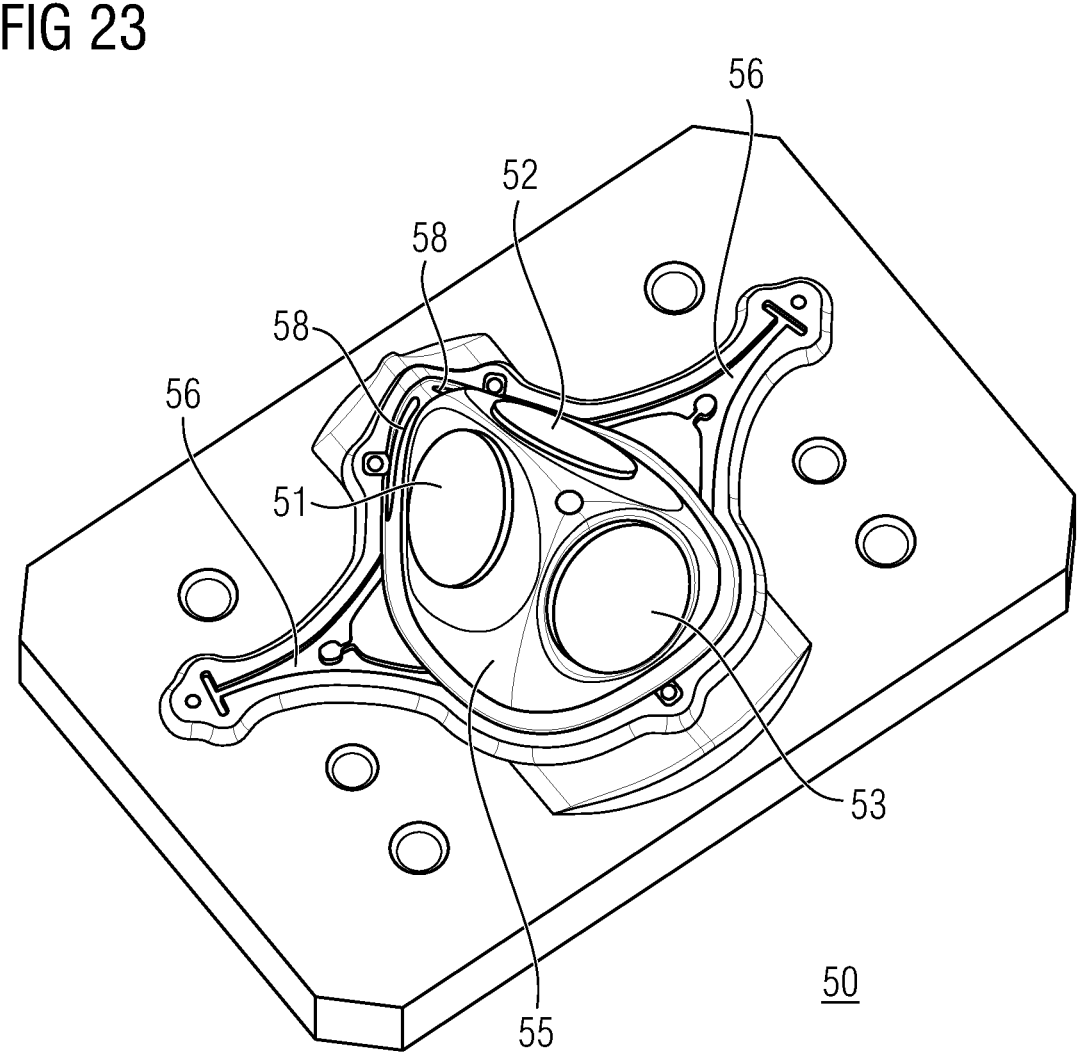
FIG. 23 shows a part of the mould of a faceblank with a nose seal.

FIG. 23 shows a complete mould half 50 of the faceblank 5, into which mould half 50 the moulding shape 58 has been formed for the formation of the nose seal 31. This mould half 50 is for the inner side of the faceblank 5. Another mould half is needed for the outer side of the faceblank 5, and this is implemented in a corresponding manner. In the moulding of the faceblank 5, the mould halves are placed against each other, and material, such as silicone, used for the moulding of the faceblank 5, is injection-moulded into the mould, in other words into the intermediate space defined by the mould halves.

The invention should not be understood to be limited only by the below claims, but the invention is to be understood to include all their legal equivalents and the combinations of the embodiments presented.

LIST OF REFERENCE NUMBERS USED

1 respiratory protective device/face mask hygiene product
2, 3, 4 filter opening
5 faceblank
6 head harness, fastening
7 tongue
10 filter (embodiment of respiratory protective device/face mask hygiene product), combination part (embodiment of method)
10' filter set
11 filter part (embodiment of respiratory protective device/face mask hygiene product), part to be reinforced (embodiment of method)
12 frame
13 groove
14 through hole
31 nose seal
40 electrode
41 moulding pattern of nose seal in electrode
50' mould half for inner part of faceblank 5, before the formation of moulding shape for nose seal
50 mould half for inner part of faceblank 5, to which mould half the moulding shape for nose seal has been implemented
51, 52, 53 moulding shape for filter openings 1, 2, 3
56 moulding shape for head harness 6
57 moulding shape for rebate
58 moulding shape for nose seal, most advantageously implemented by means of electric discharge machining
100 mould
101 mould, first part
102 mould, second part.
103 die cutting press
104 counter piece of die cutting press
105 parts of die cutting press
106 middle part
107 parts of counter piece of die cutting press
108 area remaining between the parts of die cutting press
109 outlet opening
120 guide pin
121 guide hole
201 reel brakes
202 main reels
203 backup reels
204 guide rolls
205 combined web
206 injection moulding machine
207 moving side of mould
208 non-moving side of mould
209 extrusion screw
210 moulded pieces joined to the web
211 pincher rolls
212 turn rolls (for example, 45 degrees)
213 turn rolls (for example, 90 degrees)
214 marking device for making a marking on the surface of the piece (for example, laser marking or pad printing device)
215 marked piece
216 detaching device/detaching of pieces from the web
217 removal device/extra empty web removed
218 conveyor belt
219 packaging equipment
220 packed product
1200 web (in other words continuous band)
1200' web to which the filters 10 have been moulded
1201 uncut part

The invention claimed is:

1. A method for the manufacture of a reinforced textile part, nonwoven fabric part or their combination part (11), characterised in that in the method:

wherein the part to be reinforced (11) comprising textile, non-woven fabric or both of these, is partially separated from a web (1200, 1205) of textile, non-woven fabric or both by a die cutting step before a moulding step, so that the part to be reinforced (11) remains in a material connection with the web (1200, 1205) of textile, non-woven fabric or both, such that a portion of a perimeter or circumference of the part to be reinforced (11) is not die cut from the web (1200, 1205), wherein the partial separation of the part to be reinforced (11) from the web (1200, 1205) is carried out by one or more cutting parts (105, 107) implemented in the mould (100);

wherein said part to be reinforced (11) is placed into said mould (100) while stretched and wherein said stretching is maintained at the same time as a frame (12), which encircles the part to be reinforced (11), is moulded directly onto said part to be reinforced (11) in the same mould (100) containing said part to be reinforced (11) by means of an injection moulding process, wherein the stretching is carried out by pre-tensioning the part to be reinforced (11) before closing the mould (100), and by using the mould (100) to ensure that the pre-tensioning is maintained when the mould (100) closes, such that after the injection moulding step, the part to be reinforced (11) along with the injection moulded frame (12) encircling the part to be reinforced (11) is transferred by the web (1200, 1205) moving across the opened mould (100).

2. The method according to claim 1, wherein: the web (1200, 205) is a web of a single textile or non-woven fabric layer coming from a reel (202, 203) or a number of layers of textiles and/or non-woven fabrics coming from separate reels (202, 203).

3. The method according to claim 1, wherein: at least said portion of a perimeter or circumference of the part to be reinforced (11) that is not die cut from the web (1200, 1205) and are in a material connection with said web (1200, 1205) are transferred in a feed direction from said opening mould (100) without breaking off.

4. The method according to claim 1, wherein: the part to be reinforced (11) comprising textile, non-woven fabric or both of these comprises several material layers, and where material layers are pressed against each other during moulding by means of pins arranged in the mould (100).

5. The method according to claim 4, wherein: the pins are located in the frame (12) area.

6. The method according to claim 1, wherein: several parts to be reinforced (11) are moulded in parallel and transferred in a manufacturing process while in a material connection to each other without being detached from one another, by means of the uncut part (1201) of the web (1200, 205).

7. The method according to claim 1, wherein: the method is used to manufacture a filter (10) for a respiratory protective device or face mask hygiene product (1).

8. The method according to claim 7, wherein the filter (10) for a respiratory protective device or face mask hygiene product (1) comprises a filter part (11) that contains said textile and/or non-woven fabric; and said injection moulded frame (12) that encircles it, and wherein the frame (12) has been fastened by injection moulding directly to the filter part (11).

9. The filter (10) according to claim 8, wherein: the filter part (11) comprises several layers.

10. The filter (10) according to claim 8, wherein: the filter part (11) comprises at least three filter material layers.

11. The filter according to claim 8, wherein: in the frame (12), an outer edge has been implemented so that the outer edge of each frame (12) consists of a groove (13).

12. The filter according to claim 8, wherein: polypropylene is used in the filter part (11) as filter fabric/fabrics and also in the filter frame (12).

13. The filter according to claim 12, wherein: the filter part (11) is non-woven polypropylene and the frame (12) is moulded and of polypropylene that is hard plastic.

* * * * *